United States Patent
Ebizuka et al.

(10) Patent No.: US 6,927,914 B2
(45) Date of Patent: Aug. 9, 2005

(54) GRISM

(75) Inventors: Noboru Ebizuka, Wako (JP); Kashiko Kodate, Nishitokyo (JP); Keiko Oka, Tokyo (JP); Masanori Ie, Tokyo (JP); Toshikazu Ebisuzaki, Wako (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 10/457,408

(22) Filed: Jun. 10, 2003

(65) Prior Publication Data

US 2004/0070853 A1 Apr. 15, 2004

(30) Foreign Application Priority Data

Jun. 11, 2002 (JP) .......................... 2002-170068

(51) Int. Cl.[7] .............................. G02B 27/44; G02B 5/04
(52) U.S. Cl. ........................ 359/566; 359/565; 359/831; 356/305
(58) Field of Search ............................ 359/565, 566, 359/831, 15, 569, 571, 832, 1; 356/305, 71; 348/759

(56) References Cited

U.S. PATENT DOCUMENTS

| | | |
|---|---|---|
| 5,166,831 A | 11/1992 | Hart |
| 5,311,367 A * | 5/1994 | Ohki et al. .................. 359/832 |
| 5,541,776 A | 7/1996 | Kobayashi et al. |
| 5,629,764 A * | 5/1997 | Bahuguna et al. ............. 356/71 |
| 6,219,110 B1 * | 4/2001 | Ishikawa et al. ............ 348/759 |
| 2002/0008921 A1 | 1/2002 | Ebizuka et al. |
| 2002/0176124 A1 * | 11/2002 | Wise et al. ..................... 359/1 |

FOREIGN PATENT DOCUMENTS

| | | |
|---|---|---|
| EP | 0 602 992 A1 | 6/1994 |
| WO | WO 93/21548 | 10/1993 |

OTHER PUBLICATIONS

Aikio, "Hyperspectral prism–grating–prism imaging spectrograph," VTT Publications 435, Finland, Jun. 16, 2001.

Traub, "Constant–dispersion grism spectrometer for channeled spectra," Journal of the Optical Society of America, vol. 7, No. 9, Sep. 1, 1990, pp. 1779–1791.

* cited by examiner

Primary Examiner—Audrey Y. Chang
(74) Attorney, Agent, or Firm—Birch, Stewart, Kolasch & Birch, LLP

(57) ABSTRACT

In order to achieve highly dispersive spectrometry in wide wavelength with the use of a single grism, but not a plurality of grisms, the grism is composed of a prism the vertex angle of which can be varied and a volume phase holographic (VPH) grating. More specifically, the grism comprises a prism the vertex angle of which can be varied; and a VPH grating being a diffraction grating and disposed substantially orthogonal with respect to a side including the vertex angle of the prism; the VPH grating being rotated around an axis being substantially orthogonal to the side of the prism, whereby a slope angle defined by the VPH grating and a predetermined plane is varied.

11 Claims, 7 Drawing Sheets

REFLECTION GRATING

TRANSMISSION GRATING

GRISM (DIRECT SIGHT TRANSMISSION GRATING)

GRISM

BACKGROUND OF THE INVENTION

1. Field of the Invention

The present invention relates to a grism, and more particularly to a grism used suitably for a variety of apparatuses in observation for astronomy, earth and planetary science, meteorology, environmental hygienics and the like; various spectroscopic analyzer for physics and chemistry, pathology or the like and applied to mineral substances, living organisms or the like; manufacturing installations and quality control systems for foodstuffs, medicines, chemical products or the like; and all-optical routing apparatus relating to bare bones of Wavelength Division Multiplexing (WDM) in optical communication.

It is to be noted herein that "grism" is a transmission type dispersive element prepared by combining a prism or prisms with a transmission grating so as to allow a light beam having an arbitrary order and an arbitrary wavelength to go straight or in an arbitrary direction.

2. Description of the Related Art

In recent years, a number of apparatuses for observation having both functions of imaging function and spectroscopic function have been developed with progress of two-dimensional detectors in fields of astronomy, earth and planetary science, meteorology, and environmental hygienics. In such an apparatus for observation, a grism is frequently used for a dispersive element.

Since a vertex angle of a prism constituting a grism is fixed in a conventional grism, rectilinear propagating wavelength and most effective wavelength have been fixed also.

For this reason, there has been such a problem that a plurality of grisms having different rectilinear propagating wavelengths must be prepared in the case where highly dispersive spectroscopy is conducted in wide wavelength.

OBJECT AND SUMMARY OF THE INVENTION

The present invention has been made in view of the above-described problems involved in the prior art, and an object of the invention is to provide a grism by which highly dispersive spectroscopy can be effected in wide wavelength with use of a single member thereof without requiring a plurality of grisms.

In order to achieve the above-described object, a grism according to the present invention is constituted by combining a prism a vertex angle of which can be varied with a volume phase holographic (VPH) grating.

More specifically, the grism according to the present invention comprises a prism the vertex angle of which can be varied; and a VPH grating being a diffraction grating and disposed substantially orthogonal with respect to a side including the vertex angle of the prism; the VPH grating being rotated around an axis being substantially orthogonal to the side of the prism, whereby a slope angle defined by the VPH grating and a predetermined plane is varied.

Furthermore, a grism according to the present invention is arranged in such that light is input from the outside through a surface of the prism, the light input inside the prism is input to the VPH grating after transmitting through the prism, and the light transmitted through the VPH grating is output to the outside through the surface of the VPH grating, so that at least one of the vertex angle of the prism and the slope angle is varied, whereby a direction of the light to be output to the outside is varied.

Moreover, a grism according to the present invention is arranged in such that light is input from the outside through a surface of the VPH grating, the light input inside the VPH grating is input to the prism after transmitting through the VPH grating, and the light after transmitting inside the prism is output to the outside through a surface of the prism, so that at least one of the vertex angle of the prism and the slope angle is varied, whereby a direction of the light to be output to the outside is varied.

Still further, a grism according to the present invention comprises a prism the vertex angle of which can be varied, a VPH grating being a diffraction grating and disposed substantially orthogonal with respect to a side including the vertex angle of the prism, and holding substrates for holding the VPH grating; the above-described VPH grating being rotated around an axis being substantially orthogonal to the side of the prism, whereby a slope angle defined by the VPH grating and a predetermined plane is varied.

Yet further, a grism according to the present invention is arranged in such that light is input from the outside through a surface of the prism, the light input inside the prism is input to the VPH grating after transmitting through the prism, and the light transmitted through the VPH grating is output to the outside through a surface of the holding substrates, so that at least one of the vertex angle of the prism and the slope angle is varied, whereby a direction of the light to be output to the outside is varied.

Besides, a grism according to the present invention is arranged in such that light is input from the outside through a surface of the holding substrates, the light input inside the VPH grating is input to the prism after transmitting through the VPH grating, and the light transmitted inside the prism is output to the outside through a surface of the prism, so that at least one of the vertex angle of the prism and the slope angle is varied, whereby a direction of the light to be output to the outside is varied.

In addition, a grism according to the present invention is arranged in such that the prism is prepared from two outer members made of a transparent material and an inner member being a liquid transparent in a region of wavelength applied and sealed in between the two outer members.

Further, a grism according to the present invention is arranged in such that a direction of light to be output to the outside is maintained in a predetermined direction by varying the vertex angle of the prism and the slope angle to predetermined angles, respectively, whereby a state wherein the VPH grating satisfies Bragg's condition is kept as it is.

Moreover, a grism according to the present invention comprises a first prism the vertex angle of which can be varied, a second prism the vertex angle of which can be varied, and a VPH grating being a diffraction grating; the above-described grism being formed by sandwiching the VPH grating in between the first prism and the second prism so as to oppose the vertex angle of the first prism to the vertex angle of the second prism; light being input from the outside through a surface of the first prism, the light input inside the first prism being input to the VPH grating after transmitting through the first prism, the light passed through the VPH grating being input into the second prism, and the light transmitted through the second prism being output to the outside from the surface of the second prism.

Furthermore, a grism according to the present invention is arranged in such that each of the first and second prisms has a refractive index twice larger than that of the outside of the above-described first and second prisms.

Besides, a grism according to the present invention is arranged in such that a direction of light to be output to the outside is maintained in a predetermined direction by varying the vertex angle of the first prism and the vertex angle of the second prism into predetermined angles, respectively, whereby a state wherein the VPH grating satisfies Bragg's condition is kept as it is.

BRIEF DESCRIPTION OF THE DRAWING

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

An example of preferred embodiments of a grism according to the present invention will be described in detail hereinafter by referring to the accompanying drawings.

Figure 1:
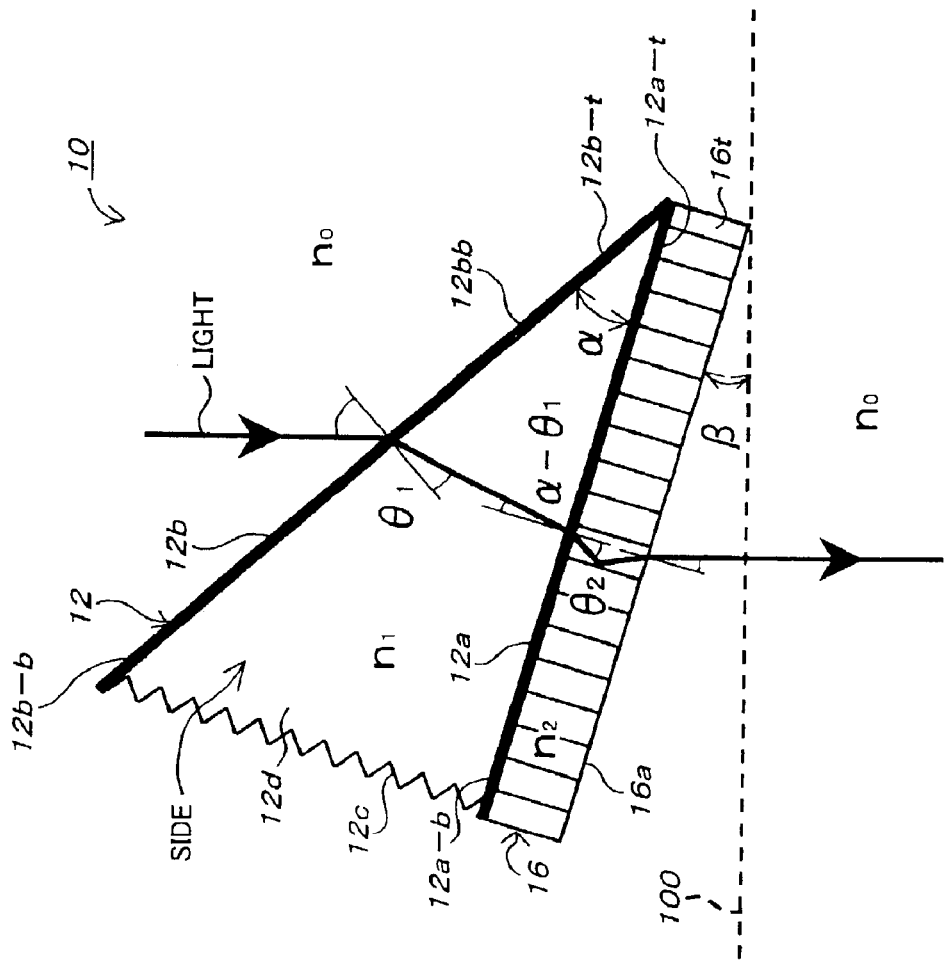
FIG. 1 is a conceptual, constitutional, explanatory diagram showing a first embodiment of the grism according to the present invention.

FIG. 1 is a conceptual, constitutional, explanatory diagram showing a grism according to the first embodiment of the present invention wherein a grism 10 is composed of a prism 12 the vertex angle of which can be varied and a VPH grating 16 being a diffraction grating.

The prism 12 is composed of two plate-like outer members 12a, 12b and an inner member 12d. In this case, the two outer members 12a and 12b are openable in directions wherein they define an angle so as to become larger or smaller with each other at fulcrum being an end 12a-t of the outer member 12a and an end 12b-t of the outer member 12b. The inner member 12d has been sealed in an internal space defined by a rubber-like sealing member 12c provided so as to connect the other end 12a-b of the outer member 12a with the other end 12b-b of the outer member 12b.

In this case, the outer members 12a and 12b as well as the inner member 12d are made from a transparent material. For example, the outer members 12a and 12b are made from glass, while silicon oil being a liquid transparent in a region of wavelength applied is used for the inner member 12d. Furthermore, the sealing member 12c is made from, for example, a synthetic rubber.

An angle defined by the outer member 12a and the outer member 12b of the prism 12 is made to be the vertex angle α of the prism 12. The vertex angle α of the prism 12 is made to be variable by means of a driving means (not shown).

On the other hand, a material for preparing the VPH grating 16 maybe, for example, gelatin bichromate, a photosensitive resin or the like. The VPH grating 16 is disposed substantially orthogonally with respect to a side including the vertex angle α of the prism 12 (corresponding to a plane of the prism 12 showing a region of a substantially triangular contour in FIG. 1).

Moreover, an angle defined by the VPH grating 16 stuck fast to the outer member 12a and a plane perpendicular to incident light is made to be a slope angle β of the grism 10. The slope angle β of the grism 10 is made to be variable by means of a driving means (not shown).

The VPH grating 16 may be a member sandwiched in between two holding substrates 17-1 and 17-2. In this case, the holding substrate 17-1 for holding the VPH grating 16 is positioned in between the VPH grating and the prism 12 as in a grism 10' shown in FIG. 2.

The holding substrate 17-1 and the holding substrate 17-2 are made respectively from a material being transparent and homogeneous in a region of wavelength applied, for example, glass or a plastic (resin). Furthermore, it is preferred that refractive indices of the holding substrates 17-1 and 17-2 are made to be equal to that of the VPH grating 16.

In the above described constitution, light is input from the outside through a surface of the prism 12, in other words, light is input from an incidence plane 12bb of the outer member 12b in the prism 12, the light transmitted through the prism 12 is input to the VPH grating 16, and the light transmitted through the VPH grating 16 is output from a side of an end 16a of the VPH grating 16 to the outside in case of applying the grism 10 (see FIG. 1).

Moreover, in case of the grism 10' having the holding substrates 17-1 and 17-2 (see FIG. 2), light is input from the outside through a surface of the prism 12, in other words, light is input from the incidence plane 12bb of the outer member 12b in the prism 12, the light transmitted through the prism 12 is input to the VPH grating 16, and the light transmitted through the VPH grating 16 is output from a side of an end 17-2 of the holding substrate 17-2.

In the arrangement, it is possible that the inner member 12d is shifted, for example, in response to such movement that the end 12b-b of the outer member 12b is made to be either away from or close to the end 12a-t of the outer member 12a by means of driving force of a driving means (not shown) at fulcrum of the end 12b-t of the outer member 12b and the end 12a-t of the outer member 12a in the prism 12, whereby the vertex angle α of the prism 12 is varied.

Likewise, it is possible that when either the whole grism 10 or 10' is rotated at fulcrum of the end 16t of the VPH grating 16 on the side of the vertex angle α of the prism 12 around the axis substantially orthogonal to a side of the prism 12, the slope angle β defined by the VPH grating 16 and a plane 100 perpendicular to incident light is varied.

Figure 4:
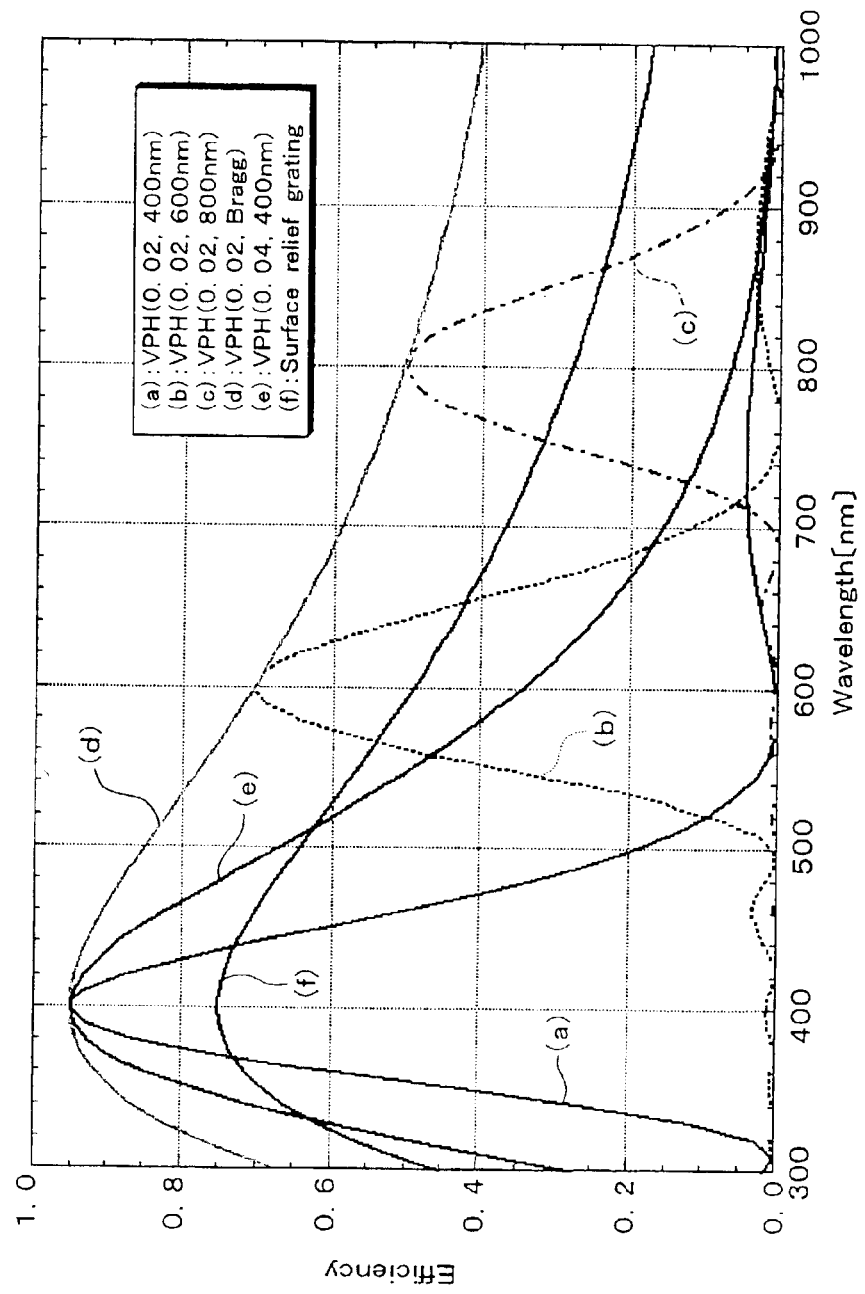
FIG. 4 is a graphical representation indicating diffraction efficiencies of cases (a) and (e) wherein an incident angle is fixed so as to be Bragg angle with respect to the maximum efficient wavelength of a VPH grating having either a refractive index modulation amount Δn 0.02 and 0.04, respectively, cases (b) and (c) wherein an incident angle is adjusted so as to satisfy conditions of Bragg diffraction in every wavelengths with respect to a VPH grating having a refractive index modulation amount Δn 0.02, respectively, an envelope curve of a case (d) wherein an incident angle is maintained always at Bragg angle, and a relief grating (f), respectively.

In case of a relief grating the surface of which has a saw-shaped grating profile, even if a vertex angle or incidence angle of a prism substrate is varied, its diffraction efficiency cannot be remarkably changed as shown in FIG. 4.

On the other hand, the VPH grating 16 is a diffraction grating which exhibits the highest efficiency in the case when it satisfies Bragg's condition.

When it is assumed that a refractive index of the VPH grating 16 is "$n_2$", lattice spacing is "d", an order of diffraction is "m", and a wavelength is "λ" in the case where gratings of the VPH grating 16 are substantially perpendicular to surfaces and sides of the VPH grating 16, the following formula (1) of an equation of Bragg diffraction is obtained.

$$m\lambda = 2n_2 d \sin\theta_b \quad \text{Formula (1)}$$

where $\theta_b$ is Bragg angle.

In FIG. 1, formulae of the incidence plane 12bb of light in the prism 12 and refraction in an interface of the prism 12 and the VPH grating 16 are given by the following formulae (2) and (3) where a refractive index of an external medium is "$n_0$", a refractive index of the inner member 12d in the prism 12 is "$n_1$", and a refractive index of the VPH grating 16 is "$n_2$".

$$n_0 \sin(\alpha+\beta) = n_1 \sin\theta_1 \quad \text{Formula (2)}$$

$$n_1 \sin(\alpha-\theta_1) = n_2 \sin\theta_2 \quad \text{Formula (3)}$$

In this case, when $\theta_2$ satisfies Bragg's condition, it result in $\theta_2 = \theta_b$. Accordingly, the formula (3) is expressed by the following formula (4).

$$n_1 \sin(\alpha-\theta_1) = n_2 \sin\theta_b \quad \text{Formula (4)}$$

Figure 2:
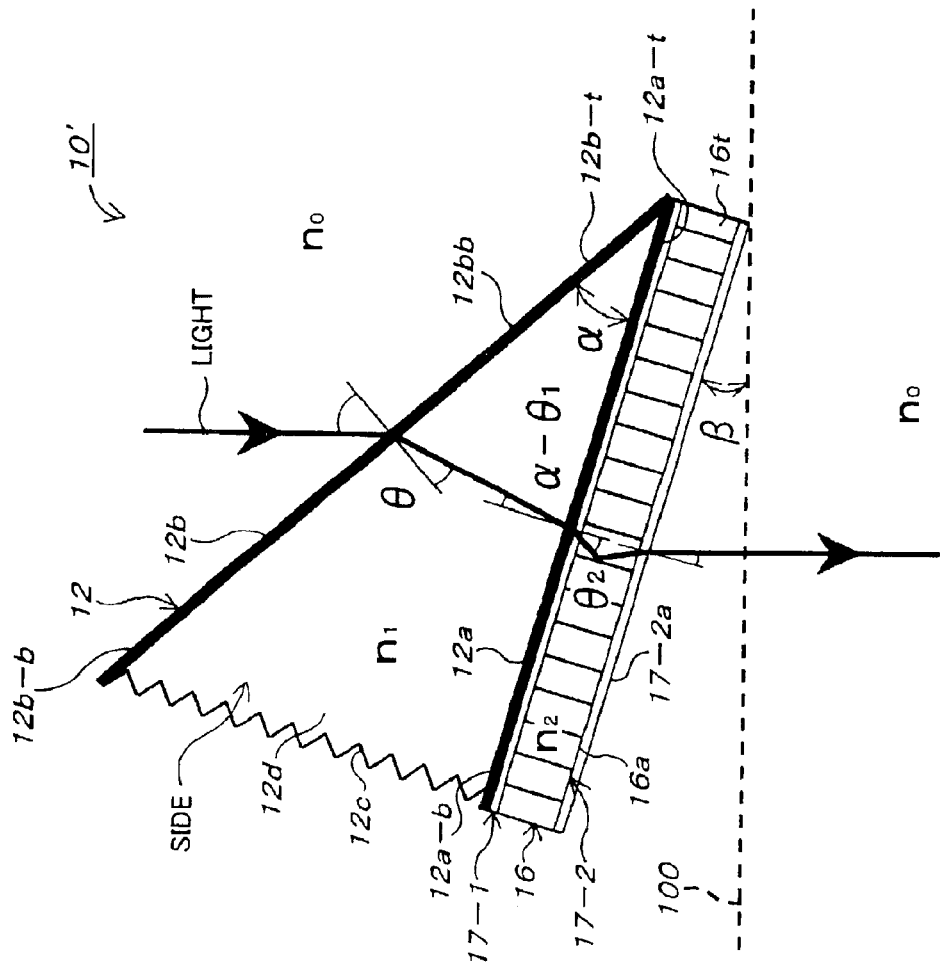
FIG. 2 is a conceptual, constitutional, explanatory diagram showing another example of the first embodiment of the grism according to the present invention.

On one hand, outgoing beam is output to the outside from either a surface of the VPH grating 16 (for example, the end 16a of the VPH grating 16 in case of the grism 10 shown in FIG. 1) or a surface of holding substrates sandwiching the VPH grating 16 between them (for example, an end 17-2a of the holding substrate 17-2 in case of the grism 10' shown in FIG. 2) in a direction of an angle $\theta_3$ defined by the outgoing beam and incident light with satisfaction of Bragg's condition. In this case, a formula of refraction in either a surface of the VPH grating 16 or a surface of the holding substrates sandwiching the VPH grating 16 between them is expressed by the following formula (5).

$$n_2 \sin\theta_b = n_0 \sin(\beta+\theta_3) \quad \text{Formula (5)}$$

In this case, even if Bragg's condition is not strictly satisfied, diffraction efficiency of the VPH grating 16 is high in the vicinity of Bragg angle (see the diffraction efficiency (e) shown in FIG. 4), $$\sin(\alpha+\beta) = \alpha+\beta$$

$$\sin\theta_1 = \theta_1$$

$$\sin(\alpha-\theta_1) = \alpha-\theta_1$$

$$\sin\theta_b = \theta_b$$

$$\sin(\beta+\theta_3) = \beta\theta_3$$

so that when it may be assumed that the above described equations are valid, the following formula (6) is given from the formulae (4) and (5)

$$\alpha = n_0(2\beta+\theta_3)/(n_1-n_0) \quad \text{Formula (6)}$$

In the case when outgoing beam is output to the outside in parallel to incident light, $\theta_3 = 0$, so that the formula (5) turns to a formula (7).

$$n_2 \sin\theta_b = n_0 \sin\beta \quad \text{Formula (7)}$$

On one hand, the formula (6) turns to the following formula (8).

$$\alpha = 2n_0\beta/(n_1-n_0) \quad \text{Formula (8)}$$

In other words, when the vertex angle α of the prism 12 and the slope angle β defined by the VPH grating 16 and the plane 100 perpendicular to incident light are varied at a ratio determined by the above-described formula (6) or (8), wavelength can be varied under the condition where high diffraction efficiency is kept while maintaining always Bragg's condition (see the diffraction efficiency (d) shown in FIG. 4).

For instance, wavelength can be varied while keeping high diffraction efficiency, when a ratio is arranged to be α=4β in the case where a refractive index "$n_0$" of an external medium is 1.0, outgoing beam is output to the outside in parallel to incident light, and a refractive index "$n_1$" of the inner member 12d is 1.5, while a ratio is arranged to be α=2β in the case where "$n_1$" is 2.0.

As a result, high dispersive spectrometry of wide wavelength can be implemented with single use of grism in accordance with the grism 10 or 10' of the present invention without requiring a plurality of grisms while maintaining high efficiency.

On one hand, it is also possible that a grism is prepared by combining a surface of a prism the vertex angle of which is variable with a transmission diffraction grating (relief grating) having a stepped profile. However, in such grism as described above, when the vertex angle of a prism is varied, a direction of outgoing beam and a wavelength thereof can be arbitrarily changed, but the most efficient wavelength cannot be varied (see the diffraction efficiency (f) shown in FIG. 4).

More specifically, highly dispersive spectrometry can be conducted by the use of the grism 10 or 10' according to the present invention in wide wavelength with maintaining high efficiency. On the contrary, such efficient spectrometry as described above cannot be attained by the use of a grism which is prepared by combining a surface of a prism the vertex angle of which is variable with a transmission diffraction grating having a stepped profile.

Furthermore, it is to be noted that the invention is not limited to such arrangement that light is input from the incidence plane 12bb of the outer member 12b in the prism 12 the vertex angle of which is variable in the grism 10 or 10' according to the present invention.

For instance, the grism 10 shown in FIG. 1 may be modified in such that light is input from the outside through a surface of the VPH grating 16, in other words, light is input from the end 16a of the VPH grating 16, the light input to the VPH grating 16 transmits the VPH grating 16 to be input to the prism 12, and the light thus transmitted the prism 12 is output to the outside through the incidence plane 12bb of the outer member 12b in the prism 12.

The grism 10' shown in FIG. 2 may be arranged in such that light is input from the outside through a surface of the holding substrate 17-2, in other words, such light is input from the end 17-2a of the holding substrate 17-2, the light input to the VPH grating 16 transmits through the inside of the VPH grating 16 to be input to the prism 12, and the light thus transmitted through the inside of the prism 12 is output to the outside from the incidence plane 12bb of the outer member 12b in the prism 12.

In even such situations as mentioned above, highly dispersive spectrometry can be implemented in wide wavelength while keeping high efficiency in the grism 10 or 10' according to the present invention.

In the following, the second embodiment of a grism according to the present invention will be described by referring to FIG. 3.

Figure 3:
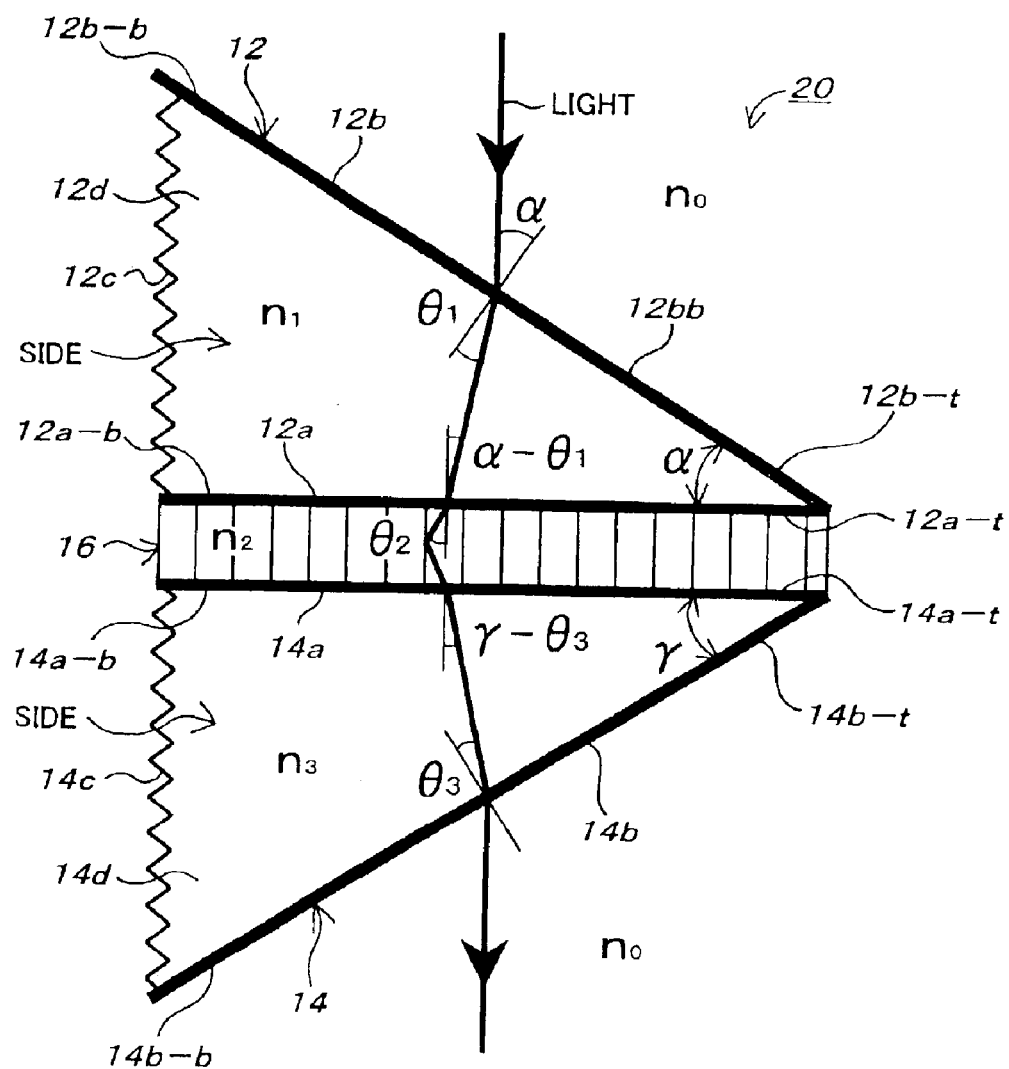
FIG. 3 is a conceptual, constitutional, explanatory diagram showing a second embodiment of the grism according to the present invention.

In FIG. 3, the same or equal constitution with or to that shown in FIGS. 1 and 2 are designated by the same reference characters with those applied in FIGS. 1 and 2, respectively, and the detailed description of the constitution and operations thereof are omitted.

When a grism 20 in the second embodiment is compared with the grism 10 in the above-described first embodiment, the former differs from the latter in that a prism 14 is further applied to the latter constitution in addition to a prism 12.

More specifically, the grism 20 is constituted so as to sandwich a VPH grating 16 being a diffraction grating in between the prism 12 the vertex angle of which is variable and the prism 14 the vertex angle of which is variable.

The prism 14 has a common constitution with that of the prism 12 and which is composed of two plate-like outer members 14a, 14b and an inner member 14d. In this case, the two outer members 14a and 14b are openable in directions wherein they define an angle so as to become larger or smaller with each other at fulcrum being an end 14a-t of the outer member 14a and an end 14b-t of the outer member 14b. The inner member 14d has been sealed in an internal space defined by a rubber-like sealing member 14c provided so as to connect the other end 14a-b of the outer member 14a with the other end 14b-b of the outer member 14b.

In this case, the outer members 14a and 14b as well as the inner member 14d are made from a transparent material. For example, the outer members 14a and 14b are made from glass, while silicon oil being a liquid transparent in a region of wavelength applied is used for the inner member 14d. Furthermore, the sealing member 14c is made from, for example, a synthetic rubber.

In the second embodiment, the prism 12 is made from a material common with that of the prism 14, so that a refractive index of the prism 12 is equal to that of the prism 14.

An angle defined by the outer member 12a and the outer member 12b of the prism 12 is considered to be a vertex angle α of the prism 12. On one hand, an angle defined by the outer member 14a and the outer member 14b of the prism 14 is considered to be a vertex angle γ of the prism 14. The vertex angle α of the prism 12 and the vertex angle γ of the prism 14 are made to be variable by means of driving means (not shown), respectively.

The VPH grating 16 is sandwiched in such that the outer member 12a of the prism 12 is opposed to the outer member 14a of the prism 14 as well as the vertex angle α of the prism 12 is opposed to the vertex angle γ of the prism 14. In this case, the VPH grating 16 is disposed substantially perpendicular to a side of the prism 12 involving the vertex angle α (corresponding to a plane of the prism 12 showing a substantially triangular shape in FIG. 3) and a side of the prism 14 involving the vertex angle γ of the prism 14 (corresponding to a plane of the prism 14 showing a substantially triangular shape in FIG. 3).

In the above-described constitution of the grism 20, light is input from the outside through a surface of the prism 12, in other words, light is input from the incidence plane 12bb of the outer member 12b in the prism 12, the light input to the inside of the prism 12 transmits through the same, the light thus transmitted is input to the VPH grating 16, and the light transmitted inside the VPH grating 16 is input to the inside of the prism 14. The light input inside the prism 14 transmits through the prism 14, and is output to the outside through a surface of the prism 14, in other words, the light is output to the outside from the side of the outer member 14b of the prism 14.

In this situation, it is possible that when the outer member 12b of the prism 12 is transferred by means of a driving means (not shown) in a direction wherein the outer member 12b comes to be away from or close to the outer member 12a, the inner member 12d varies in response to the movement of the outer member 12b, whereby the vertex angle α of the prism 12 can be varied.

Likewise, it is possible that when the outer member 14b of the prism 14 is transferred by means of a driving means (not shown) in a direction wherein the outer member 14b comes to be away from or close to the outer member 14a, the inner member 14d varies in response to the movement of the outer member 14b, whereby the vertex angle γ of the prism 12 can be varied.

In case of a relief grating the surface of which has a saw-shaped grating profile, even if a vertex angle or incidence angle of a prism substrate is varied, its diffraction efficiency cannot be remarkably changed as shown in FIG. 4.

On the other hand, the VPH grating 16 is a diffraction grating which exhibits the highest efficiency in the case when it satisfies Bragg's condition.

When it is assumed that a refractive index of the VPH grating 16 is "$n_2$", lattice spacing is "d", an order of diffraction is "m", and a wavelength is "λ" in the case where gratings of the VPH grating 16 are substantially perpendicular to surfaces and sides of the VPH grating 16, the following formula (9) of an equation of Bragg diffraction is obtained.

$$m\lambda = 2n_2 d \sin\theta_b \qquad \text{Formula (9)}$$

where $\theta_b$ is Bragg angle.

In FIG. 3, formulae of the incidence plane 12bb of light in the prism 12 and refraction in an interface of the prism 12 and the VPH grating 16 are given by the following formulae (10) and (11) where a refractive index of an external medium is "$n_0$", and a refractive index of the prism 12 is "$n_1$".

$$n_0 \sin\alpha = n_1 \sin\theta_1 \qquad \text{Formula (10)}$$

$$n_1 \sin(\alpha - \theta_1) = n_2 \sin\theta_2 \qquad \text{Formula (11)}$$

In this case, when it is assumed that $\theta_2 = \theta_b$, and the formula (11) is replaced by the formula (9), the formula (12) is obtained.

$$n_1 \sin(\alpha - \theta_1) = m\lambda/2d \qquad \text{Formula (12)}$$

wherein the prism 12 the vertex angle of which can be varied exhibits a refractive index of twice larger than the refractive index "$n_0$" of an external medium of the prism 12. Namely, sin α = 2 sin θ from the Formula (10) in case of $n_1 = 2n_0$, so that the formula (12) is expressed as follows, when it may be assumed that $\alpha = 2\theta_1$.

$$n_1 \sin\theta_1 = m\lambda/2d \qquad (13)$$

From the formulae (13) and (10), the following formula (14) is introduced.

$$n_0 \sin \alpha = m\lambda/2d$$

$$m\lambda = 2n_0 d \sin \alpha \quad \text{Formula (14)}$$

Namely, when the vertex angle α is varied in the above-described formula (14), its wavelength can be varied under the condition wherein high efficiency is maintained while keeping always Bragg's condition.

Moreover, when a refractive index of the prism 14 the vertex angle of which can be varied is considered to be "$n_3$", $$n_2 \sin \theta_2 = n_3 \sin(\gamma - \theta_3) \quad \text{Formula (15)}$$

Furthermore, when it is assumed that outgoing beam moves through in a direction of an angle $\theta_4$ defined by the outgoing beam and incident light, the following formula is expressed.

$$n_3 \sin \theta_3 = n_0 \sin(\gamma + \theta_4) \quad \text{Formula (16)}$$

When $n_3 = 2n_0$, and $\theta_4 = 0$, the Formula (16) becomes $$\sin \gamma = 2 \sin \theta_3 \quad \text{Formula (17)}$$

so that when it may be assumed that $\gamma = 2\theta_3$, the formula (15) is expressed by the following formula:

$$n_2 \sin \theta_2 = n_3 \sin \theta_3$$

so that it is expressed by the following formula:

$$n_3 \sin \theta_3 = m\lambda/2d \quad \text{Formula (18)}$$

as in the case of the formula (12).

As a result, a formula (19) is introduced from the formulae (18) and (17).

$$n_0 \sin \gamma = m\lambda/2d$$

$$m\lambda = 2n_0 d \sin \gamma \quad \text{Formula (19)}$$

From the formulae (19) and (14), it becomes $$\gamma = \alpha$$

so that wavelength can be varied under the condition wherein high efficiency is always maintained in rectilinearly propagating direction.

For instance, when an external medium of the grism 20 is air, a refractive index $n_1$ of the prism 12 is made to be $n_1 = 2$ with respect to refractive index of air "$n_0 = 1$", a wavelength can be varied in the condition wherein high efficiency is maintained, because the VPH grating 16 satisfies Bragg's condition.

Accordingly, it is suitable that a material of the prism 12 is changed to be twice larger than that of an external medium in response to variations of the medium applied outside the prism 12, for example, variations in media of air, water, the other types of liquid and the like.

Thus, according to the grism 20 of the present invention, highly dispersive spectrometry can be conducted in wide wavelength with the use of a single grism, but not a plurality of grisms while maintaining high efficiency.

Furthermore, in the grism 20 according to the present invention, a position to which light is input from the incidence plane 12bb of the outer member 12b in the prism 12 coincides with that through which light is output to the outside from the side 14b of the outer member 14b in the prism 14, so that highly dispersive spectrometry can be effected in wide wavelength without displacing optical axis.

Moreover, when the vertex angle γ is arbitrarily selected, it is also possible to move an arbitrary wavelength in a desired direction.

In the grism 20, it is not limited to such case that light is input from the incidence plane 12bb of the outer member 12b in the prism 12, but it may be a case where light is input from the outside through a surface of the prism 14, in other words, light is input from the side of the outer member 14b, the light input inside the prism 14 transmits through the prism 14 to be input to the VPH grating 16, and the light transmitted through the VPH grating 16 is input into the prism 12. In this case, the light input inside the prism 12 may be output from a surface of the prism 12 after passing through the inside thereof, in other words, it may be arranged that the light is output from the incidence plane 12bb of the outer member 12b in the prism 12. According to the grism 20 of the present invention, in such a case also, highly dispersive spectrometry can be implemented in wide wavelength while keeping high efficiency.

In the following, applications of the grisms of the first and second embodiments according to the present invention to a variety of apparatuses will be described in more detail.

Figure 5A:
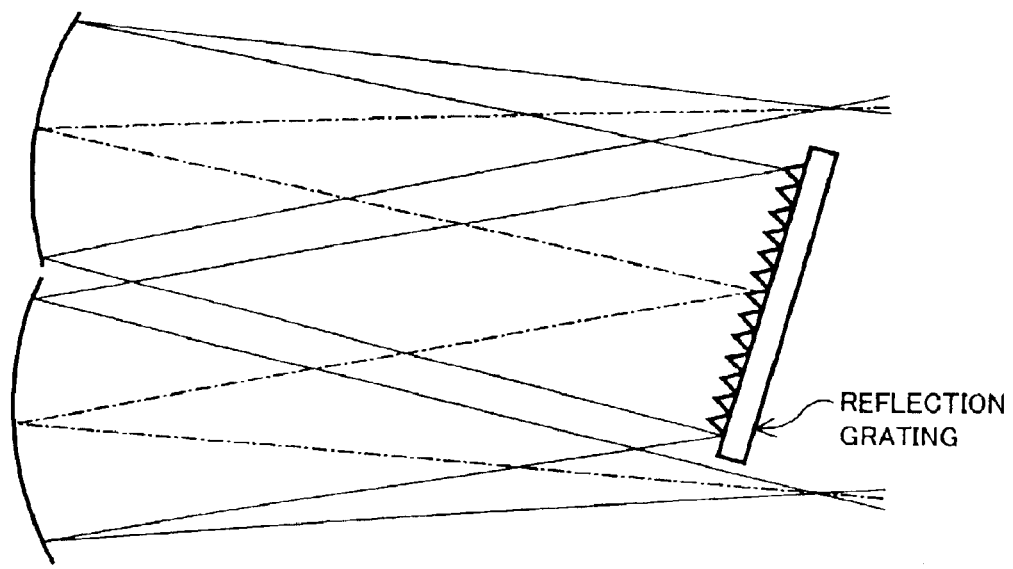
FIG. 5(a) is an explanatory diagram showing an example of a conventional reflection grating.

First, a conventional reflection grating (see FIG. 5(a)) has a large aperture ratio (F-value=focal length f/diameter D), so that its optical system becomes dark. For this reason, a conventional reflection grating has been a large diameter for requiring quantity of light.

As a result, when a conventional reflection grating is applied to a variety of apparatuses, there is such a problem that its optical system becomes a large-scale.

Figure 5B:
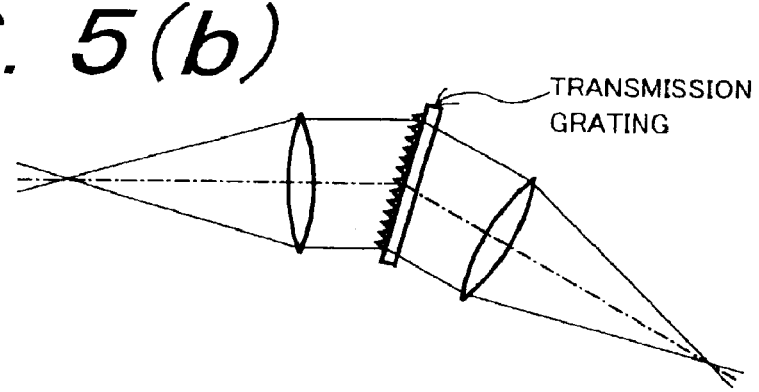
FIG. 5(b) is an explanatory diagram showing an example of transmission grating.

A transmission grating (see FIG. 5(b)) being a different one from such a conventional reflection grating as described above is known. In such transmission grating, a collimator, a camera (condenser) lens and the like may be disposed in the vicinities of the transmission grating (being a dispersive element), so that aperture ratio (F-value) becomes small.

As a result, when a transmission grating is applied to a variety of apparatuses, a compact and bright optical system can be realized.

However, even in a transmission grating by which problems involved in a conventional reflection grating have been eliminated by the above-described manner, when a transmission grating is constituted in the form of plane diffraction grating as shown in FIG. 5(b), its optical system is folded.

Figure 5C:
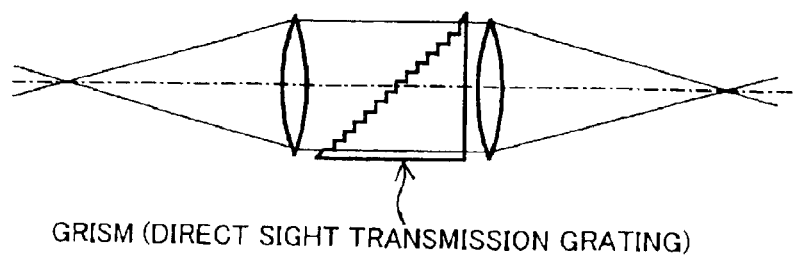
FIG. 5(c) is an explanatory diagram showing an example of grism (direct sight transmission grating)

In this respect, when a grism being a direct sight transmission grating (see FIG. 5(c)) is used in transmission grating, the resulting optical system is not folded, but the optical system can be arranged in a straight line.

Thus, when a grism being a direct sight transmission grating is applied to a variety of apparatuses, a collimator, a camera (condenser) lens and the like can be disposed in the vicinities of the grism being a dispersive element, besides in straight line.

As a result, more downsizing of the resulting whole apparatus becomes possible in comparison with a transmission grating constituted in the form of a plane diffraction grating as shown in FIG. 5(b).

More specifically, any of the grisms 10 and 10' according to the first embodiment of the present invention (see FIGS. 1 and 2) as well as the grism 20 according to the second embodiment of the invention (see FIG. 3) is a grism of direct sight transmission grating. Accordingly, when the grisms 10, 10', and 20 according to the present invention are applied to a variety of apparatuses as in the case of the above-described FIG. 5(c) collimators, camera (condenser) lenses and the like may be disposed in the vicinities of any of the grisms 10, 10', and 20, besides they may be aligned in straight line, whereby an optical system can be constituted in a small space, so that more downsizing of the whole apparatus can be realized.

Figure 6:
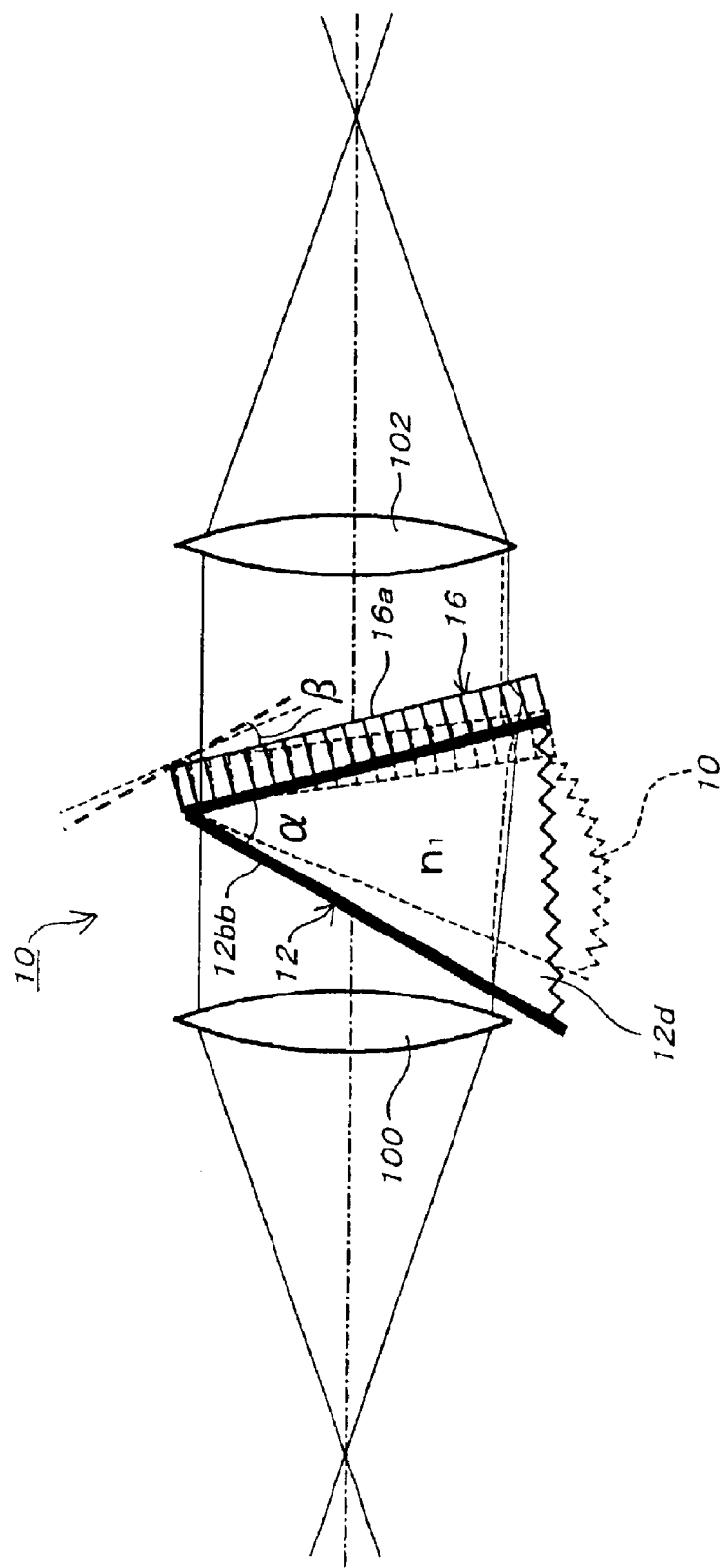
FIG. 6 is a schematic, constitutional, explanatory diagram showing an example of an optical system which is constituted by applying the grism of the first embodiment shown in FIG. 1 according to the present invention to a variety of apparatuses or constituted in accordance with the like manner.

FIG. 6 is a schematic constitutional explanatory diagram showing an example of an optical system constituted by applying the grism 10 according to the first embodiment of the present invention to a variety of apparatuses. In this optical system, when a refractive index $n_1$ of the inner member 12d of the prism 12 in the grism 10 is in a condition of $n_1 \neq 2$, for example, $n_1 = 1.5$, a refractive index $n_0$ of an external medium is 1.0. In this situation, when the vertex angle α of the prism 12 and the slope angle β of the VPH grating 16 are varied (see the grism 10 shown by a broken line in FIG. 6) so as to maintain Bragg's condition, wavelength can be varied while keeping high diffraction efficiency, whereby diffraction ray can be output in a rectilinearly propagating or an arbitrary direction.

However, it is to be noted that an optical axis of incident light and that of outgoing beam shift in parallel to each other in case of using the grism 10 (see FIGS. 1 and 2).

In the vicinities of the incidence plane 12bb of the outer member 12b of the prism 12, a lens 100 through which light to be input to the incidence plane 12bb passes is disposed, while, in the vicinities of the end 16a of the VPH grating 16, a lens 102 through which light output from the end 16a to the outside passes is disposed.

Thus, other optical parts are placed in a straight line in the vicinities of the grism 10 disposed in between the lens 100 and the lens 102 the optical axes of which are in a straight line (see the dashed line shown in FIG. 6), whereby the resulting optical system can be constituted in a small space without any fold.

Figure 7:
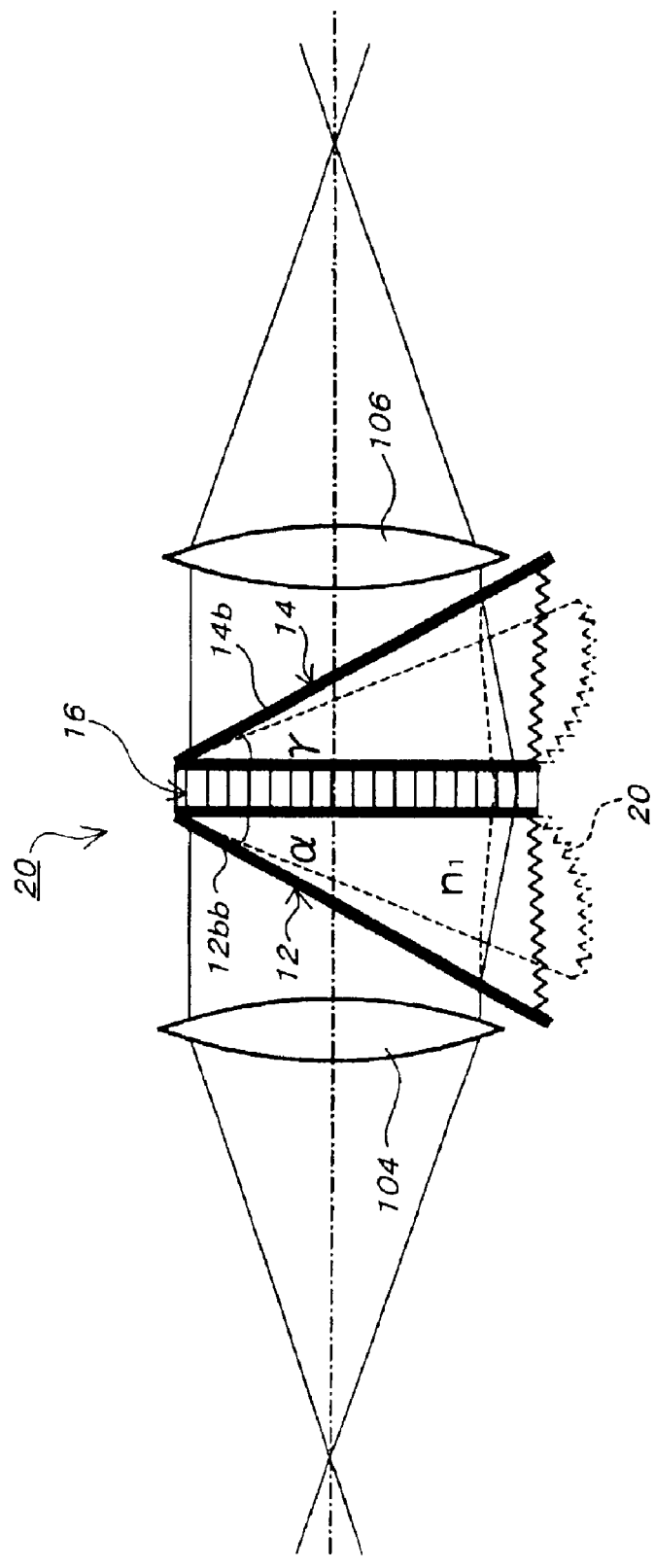
FIG. 7 is a schematic, constitutional, explanatory diagram showing an example of an optical system which is constituted by applying the grism of the second embodiment shown in FIG. 3 according to the present invention to a variety of apparatuses or constituted in accordance with the like manner.

FIG. 7 is a schematic constitutional explanatory diagram showing an example of an optical system constituted by applying the grism 20 according to the second embodiment of the present invention to a variety of apparatuses. In this optical system, when the vertex angle α of the prism 12 being a prism on an incident side is varied in the case where a refractive index $n_1$ of the prism 12 is 2, Bragg's condition can be satisfied substantially, so that wavelength can be varied with holding high diffraction efficiency.

In this case, when the vertex angle γ of the prism 14 on an outgoing side is made to be equal to the vertex angle α of the prism 12 on the incident side (see the grism 20 indicated by a broken line in FIG. 7), diffraction ray propagates rectilinearly.

On the other hand, when the vertex angle γ of the prism 14 is made to be different from the vertex angle α of the prism 12, diffraction ray can be output in an arbitrary direction.

In the vicinities of the incidence plane 12bb of the outer member 12b of the prism 12, a lens 104 through which light to be input to the incidence plane 12bb passes is disposed, while, in the vicinities of the outer member 14b of the prism 14, a lens 106 through which light output from the outer member 14b to the outside passes is placed.

Thus, other optical parts are placed in a straight line in the vicinities of the grism 20 disposed in between the lens 104 and the lens 106 the optical axes of which are in a straight line (see the dashed line indicated in FIG. 7), whereby the resulting optical system can be constituted in a small space without any fold.

FIG. 4 is a graphical representation indicating diffraction efficiencies of a variety of diffraction gratings.

More specifically, when an incident angle is fixed in a VPH grating, a range of wavelength in which high efficiency is attained as in the diffraction efficiencies (a) and (e) indicated in FIG. 4 becomes narrow.

However, when incident angle is adjusted so as to satisfy a condition of Bragg diffraction in every wavelengths as in the diffraction efficiency (b) and the diffraction efficiency (c) indicated in FIG. 4, it becomes possible to attain high efficiency in a wide range represented by an envelop curve of the diffraction efficiency (d).

Contrary to such VPH grating, diffraction efficiency of a transmission grating having a stepped profile (relief grating) does not reach 100% in principle in even blaze wavelength as in the diffraction efficiency (f) indicated in FIG. 4. Thus, even if an incident angle or the like is adjusted, diffraction efficiency cannot be changed remarkably.

Consequently, highly dispersive spectrometry is realized in wide wavelength by the use of one or more of the grisms 10, 10' and 20 according to the present invention with keeping high efficiency, while such remarkable advantage cannot be attained by the use of such transmission grating having a stepped profile as described above.

In addition, more downsizing of the whole apparatus can be realized in accordance with the description shown in FIGS. 5 through 7.

It is to be noted that the above-described embodiments may be modified as enumerated in the following paragraphs (1) to (3).

(1) In the above-described embodiments, although gelatin bichromate, a photosensitive resin and the like have been used for preparing the VPH grating 16, the present invention is not limited thereto as a matter of course.

(2) In the above-described embodiments, although it has been arranged to vary a vertex angle of the prism 12 or 14 by the use of a liquid, the invention is not limited thereto as a matter of course. Other types of prism the vertex angle of which can be varied may also be used as the prism.

(3) The above-described embodiments as well as the modifications (1) and (2) described in the above paragraphs may be appropriately combined with each other.

Since the present invention has been constituted as described above, it can provide a grism having such an excellent advantage that highly dispersive spectrometry can be conducted in wide wavelength by the use of a single grism, but not a plurality of grisms.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 2002-170068 filed on Jun. 11, 2002 including specification, claims, drawings and summary are incorporated herein by reference in its entirety.

What is claimed is:

1. A grism comprising:
   a prism the vertex angle of which can be varied; and
   a VPH grating being a diffraction grating and disposed substantially parallel with respect to a side adjacent the vertex angle of said prism;
   said VPH grating being rotated around an axis being substantially orthogonal to the side of said prism, whereby a slope angle defined by said VPH grating and a predetermined plane is varied.

2. A grism as claimed in claim 1 wherein:
   light is input from the outside through a surface of said prism, the light input inside said prism is input to said VPH grating after transmitting through said prism, and the light transmitted through said VPH grating is output to the outside through the surface of said VPH grating, so that at least one of the vertex angle of said prism and said slope angle is varied, whereby a direction of said light to be output to the outside is varied.

3. A grism as claimed in claim 1 wherein:

light is input from the outside through a surface of said VPH grating, the light input inside said VPH grating is input to said prism after transmitting through said VPH grating, and the light transmitted inside said prism is output to the outside through a surface of said prism, so that at least one of the vertex angle of said prism and said slope angle is varied, whereby a direction of said light to be output to the outside is varied.

4. A grism comprising:

a prism the vertex angle of which can be varied;

a VPH grating being a diffraction grating and disposed substantially parallel with respect to a side adjacent the vertex angle of said prism; and holding substrates for holding said VPH grating;

said VPH grating being rotated around an axis being substantially orthogonal to the side of said prism, whereby a slope angle defined by said VPH grating and a predetermined plane is varied.

5. A grism as claimed in claim 4 wherein: light is input from the outside through a surface of said prism, the light input inside said prism is input to said VPH grating after transmitting through said prism, and the light transmitted through said VPH grating is output to the outside through a surface of said holding substrates, so that at least one of the vertex angle of said prism and said slope angle is varied, whereby a direction of said light to be output to the outside is varied.

6. A grism as claimed in claim 4 wherein:

light is input from the outside through a surface of said holding substrates, the light input inside said VPH grating is input to said prism after transmitting through said VPH grating, and the light transmitted inside said prism is output to the outside through a surface of said prism, so that at least one of the vertex angle of said prism and said slope angle is varied, whereby a direction of said light to be output to the outside is varied.

7. A grism as claimed in any one of claims 1, 2, 3, 4, 5, and 6 wherein:

said prism is prepared from two outer members made of a transparent material and an inner member being a liquid transparent in a region of wavelength applied and sealed in between said two outer members.

8. A grism as claimed in claim 1 or 4, wherein:

a direction of light to be output to the outside is maintained in a predetermined direction by varying the wavelength of light, high diffraction efficiency and Bragg's condition are maintained by varying incident angle and diffraction angle of the light of said VPH through varying the vertex angle of said prism and said slope angle.

9. A grism comprising:

a first prism the vertex angle of which can be varied;

a second prism the vertex angle of which can be varied; and a VPH grating being a diffraction grating;

said grism being formed by sandwiching said VPH grating in between said first prism and said second prism so as to oppose the vertex angle of said first prism to the vertex angle of said second prism;

light being input from the outside through a surface of said first prism, the light input inside said first prism being input to said VPH grating after transmitting through said first prism, the light passed through said VPH grating being input into said second prism, and the light transmitted through said second prism being output to the outside from the surface of said second prism.

10. A grism as claimed in claim 9 wherein:

each of said first and second prisms has a refractive index twice that of the refractive index of the ambient outside of said first and second prisms.

11. A grism as claimed in any one of claims 9 and 10 wherein:

a direction of light to be output to the outside is maintained in a predetermined direction by varying the wavelength of light, high diffraction efficiency and Bragg's condition are maintained by varying incident angle and diffraction angle of the light of said VPH through varying the vertex angle of said prism and said slope angle.

* * * * *